A. DICK.

SIGNAL-LIGHT FOR LOCOMOTIVE.

No. 6,823.

Reissued Dec. 28, 1875.

Witnesses
Chas. Thurman
G. L. Dyer.

Inventor.
Andrew Dick
by Geo. W. Dyer & Co.
attys.

UNITED STATES PATENT OFFICE.

ANDREW DICK, OF HAMILTON, CANADA, ASSIGNOR TO HIMSELF, JOHN HALL, AND WILLIAM K. MUIR.

IMPROVEMENT IN SIGNAL-LIGHTS FOR LOCOMOTIVES.

Specification forming part of Letters Patent No. 129,797, dated July 23, 1872; reissue No. 6,823, dated December 28, 1875; application filed July 20, 1874.

*To all whom it may concern:*

Be it known that I, ANDREW DICK, of Hamilton, in the county of Wentworth and Dominion of Canada, have invented a new and useful improvement in Head-Lights for Locomotives, of which the following is a full, clear, and exact description, reference being had to the accompanying drawing, making part of this specification, in which—

Figure 1:
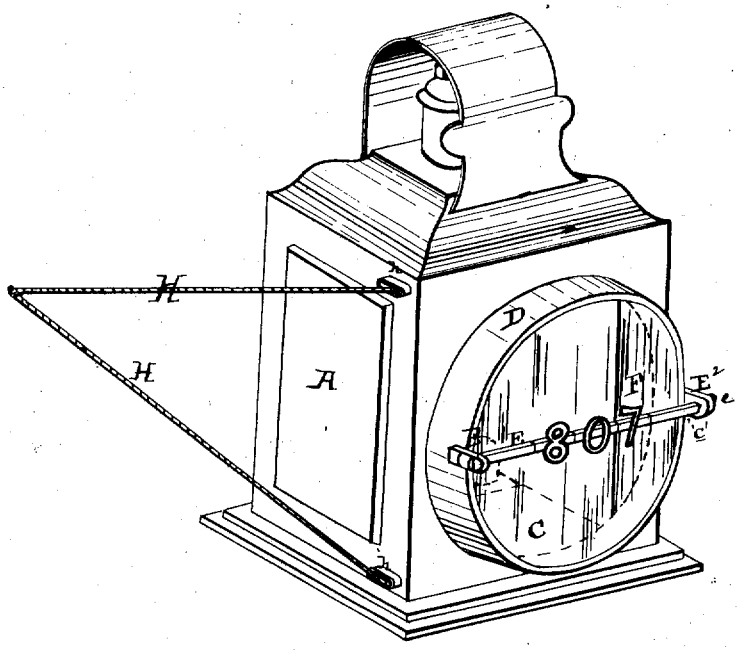
Figure 3:
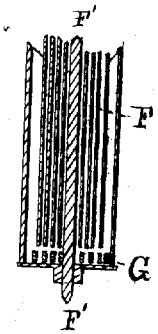
Figure 2:
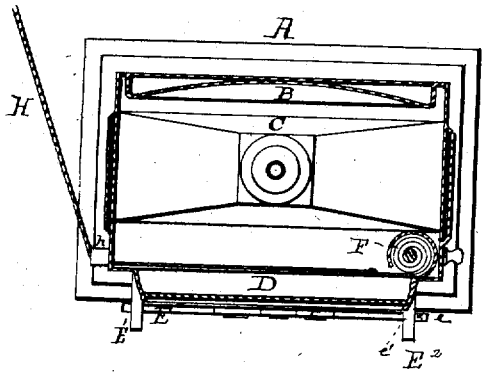

Figure 1 is a perspective view of a locomotive head-light having my improvements applied thereto. Fig. 2 is a transverse sectional view on the plane of the bar E in Fig. 1. Fig. 3 is a detached vertical section of the coiled springs, curtains, and casings, showing the curtains rolled up.

The first part of my invention relates to the combination, with a locomotive head-light, of a stationary signal to indicate the number or name of the train drawn by the locomotive.

The second part of my invention relates to the combination, with a locomotive head-light, of a removable cautionary flashing-signal.

It is well known to all who are familiar with the running of railroad-trains, particularly when trains are run by telegraphic orders, that it is a matter of much importance that the conductors of passing trains shall know whether a train which they are passing, or which is passing them, is or is not a certain train specified in their time-table, or schedule, or telegraphic train-order. It is also very essential that the engineer of a train should be able to indicate promptly to an approaching train whether his train is on the main track or on a siding; and with a view to place both of these important matters within the control of an engineer while riding on his engine, two features of construction in a head-light are found to be desirable—first, a number, or a combination of numbers, or the equivalent thereof, mounted in a fixed position, so that it or they shall be illuminated by the lamp; and, second, an independent, movable, translucent or semi-transparent screen, curtain, or shade, arranged so as to be readily seen from an approaching train, these curtains being interposed or withdrawn at the will of the engineer, in such a manner that they shall serve as a cautionary or danger signal, and yet shall not obscure the permanent signal first referred to, as indicating the number of the train.

Having thus set forth the nature and object of my invention, I will now describe one method which I have invented for carrying it into effect.

In the drawing, A represents the body of the head-light, which may be of any usual or desired construction. In this instance it is provided with a reflector, B, in rear of the lamp C, in order that as much of the light as is possible may be thrown through the circular face-plate D. E is a signal-supporting bar, mounted, in preference, in slotted lugs $E^1$ $E^2$, projecting from opposite sides of the shell or sash of the face-plate D. One end of this bar is jointed, as at *e*, the shortest pivoted end hanging down by its own weight, and thus, in connection with a pin, *e'*, which passes through the bar just inside of the ear $E^2$, serving to lock said bar firmly in position in the ears, and to guard against its accidental displacement, while, at the same time, it (the bar) can be easily removed by raising up an end, *e*, until it is in line with the rest of the bar, then sliding it inward until that end can be removed from the ear $E^2$, and then moving the bar in the opposite direction until its opposite end is disengaged from the ear $E^1$.

In the drawing I have shown the number (807) affixed to the bar; but it is evident that the signals need not be confined to numbers, but that any other device may be employed at will, although in ordinary practice numbers will generally be found the most convenient. These numbers are secured to the bar by means of sleeves—one to each figure—the sleeves fitting the bar with sufficient accuracy to assure their retention in place; or, when preferred, additional sleeves may be employed to fill the space at each side between the ears, leaving play enough to permit the bar to be put in place; or both bar and sleeves may be perforated to receive pins, or other equivalent devices for fastening the sleeves may be employed; and it is apparent that a spring-latch may be substituted for the jointed end, to retain the bar in place.

The bar may be supported independently of the lantern; but it is believed that the construction and arrangement shown will be found to be the best in practice.

F is a flexible transparent or semi-transparent signal curtain or shade. It is behind—that is, inside—of the face-plate D, but in front of the light, and is wound or rolled upon a roller or spindle, F′. This spindle is actuated by a coiled spring, G, Fig. 3, applied to one end of the roller in such a manner as to roll up the curtain when left free to act upon it. H is a cord, the forked ends of which pass over pulleys *h h*, and are attached to the upper and lower corners of the shade, while the other end may be carried back into the engineer's cab within convenient reach of the engineer. The position and arrangement of this cord in the lantern are fully shown in full lines in Fig. 2, and in dotted lines in Fig. 1; and it will be readily seen that, by pulling upon the cord, the curtain can be drawn across the open face of the head-light, so as to show a white light, or to flash a colored signal-light, at the will of the operator, the arrangement of parts being such that, as the curtain is drawn before the light, the tension of the spring G is increased, so that when the cord is released the curtain is automatically wound up.

Very many modifications of the devices which I have shown and described may be made without departing from the spirit of my invention; hence I do not wish to be confined to this precise construction; nor do I wish to be confined to their use in connection with a head-light, as they may, either in whole or in part, be used to advantage upon the various signal-lamps employed by railroad operatives.

It is desirable to exhibit different-colored flash-signals at different times from the same lamp; therefore a series of rollers with curtains of various colors are employed, these rollers being arranged upon the same side of the lamp, or upon opposite sides, as convenience may dictate.

It will be seen from the above description that the bar E, although made removable for the purpose of changing the numbers, or for other purpose, yet so far as its use as a signal is concerned, and with reference to the curtain, it is fixed, said curtain being removable at the will of the engineer, and only used when occasion requires; whereas the numbers are always in position and always in sight, either with or without the curtains.

What I claim as my invention, and desire to secure by Letters Patent, is—

1. The combination, with a locomotive head-light, of a stationary detachable signal, arranged at the front thereof, to indicate the name and number of the train, substantially as described.

2. The combination, with a locomotive head-light, of a movable or flashing cautionary signal, substantially as described.

3. In combination with a signal-lamp, a stationary signal to indicate the name or number of the train, and a removable cautionary signal, substantially as set forth.

ANDREW DICK.

Witnesses:
CHAS. THURMAN,
M. MAHONE.